United States Patent [19]

Bailey et al.

[11] Patent Number: 4,864,939
[45] Date of Patent: Sep. 12, 1989

[54] WORK TABLE ASSEMBLY MOUNTABLE ON A PANEL TRANSPORTING VEHICLE

[76] Inventors: Kent A. Bailey, 25 Marla Ct., Warwick, R.I. 02886; Burns O. Bailey, 59 Oak St., Middleboro, Mass. 02346

[21] Appl. No.: 157,258

[22] Filed: Feb. 16, 1988

[51] Int. Cl.[4] .............................................. A47B 23/00
[52] U.S. Cl. ....................................... 108/44; 108/48; 796/155
[58] Field of Search ........................ 108/44, 46, 48, 42, 108/40, 5, 90, 102, 143; 211/41, 70.5, 113; 224/273, 29.5, 42.45 R; 296/3; 294/67.22; 182/37, 127

[56] References Cited

U.S. PATENT DOCUMENTS

| 3,088,127 | 5/1963 | Eames | 108/48 X |
| 3,210,143 | 10/1965 | Frederick | 108/102 X |
| 3,483,994 | 12/1969 | Southwick | 211/41 X |
| 3,848,917 | 11/1974 | O'Neal | 296/3 |
| 3,892,088 | 7/1975 | Fleenor | 182/38 X |
| 3,934,924 | 1/1976 | Diliberti | 108/44 X |
| 4,092,050 | 5/1978 | Sobeck | 296/3 X |
| 4,278,175 | 7/1981 | Jackson | 211/41 |
| 4,720,116 | 1/1988 | Williams et al. | 182/127 X |

*Primary Examiner*—Kenneth J. Dorner
*Assistant Examiner*—José V. Chen

[57] ABSTRACT

A work table assembly that is mountable on a vehicle and that is used for supporting a flat panel or the like thereon during work operations on the panel at an installation site, the work table assembly including a frame construction that is mountable on the vehicle and spaced outwardly therefrom, the table member being mounted for pivotal movement on the frame construction and being pivotally movable relative thereto from an upper vertically disposed transport position to a lower horizontal work position, at which work position a panel is received in supporting relation for a work operation thereon.

8 Claims, 3 Drawing Sheets

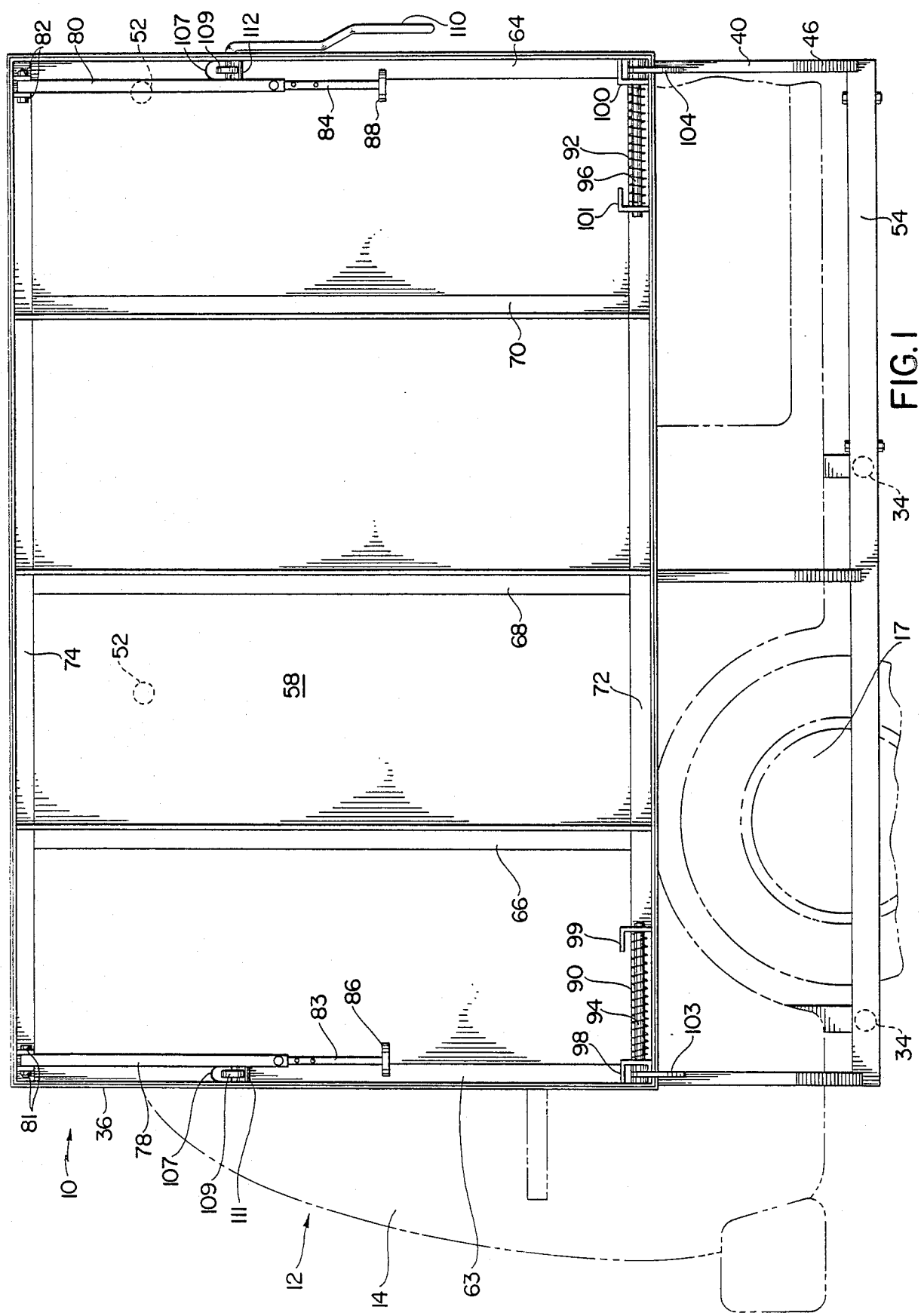

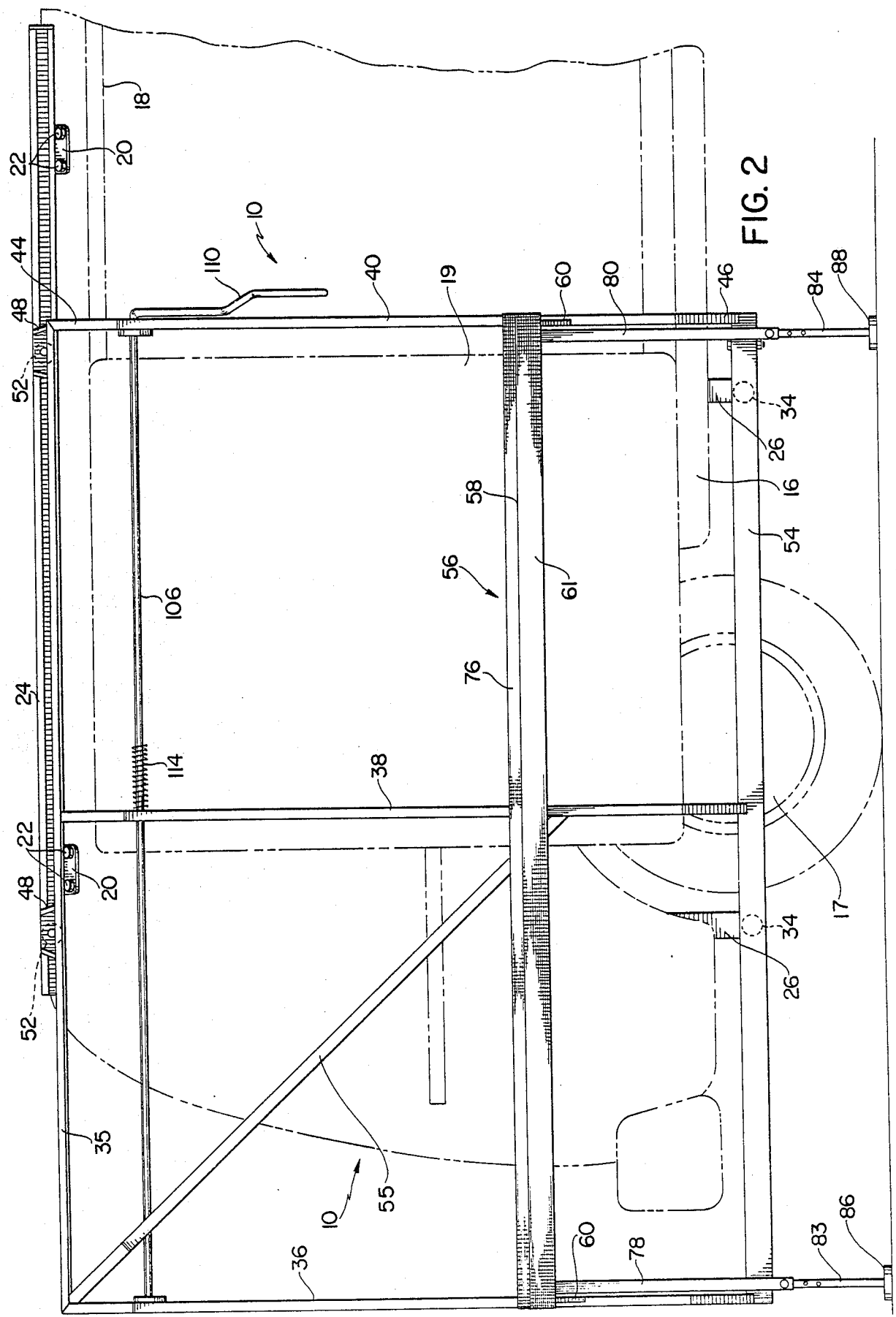

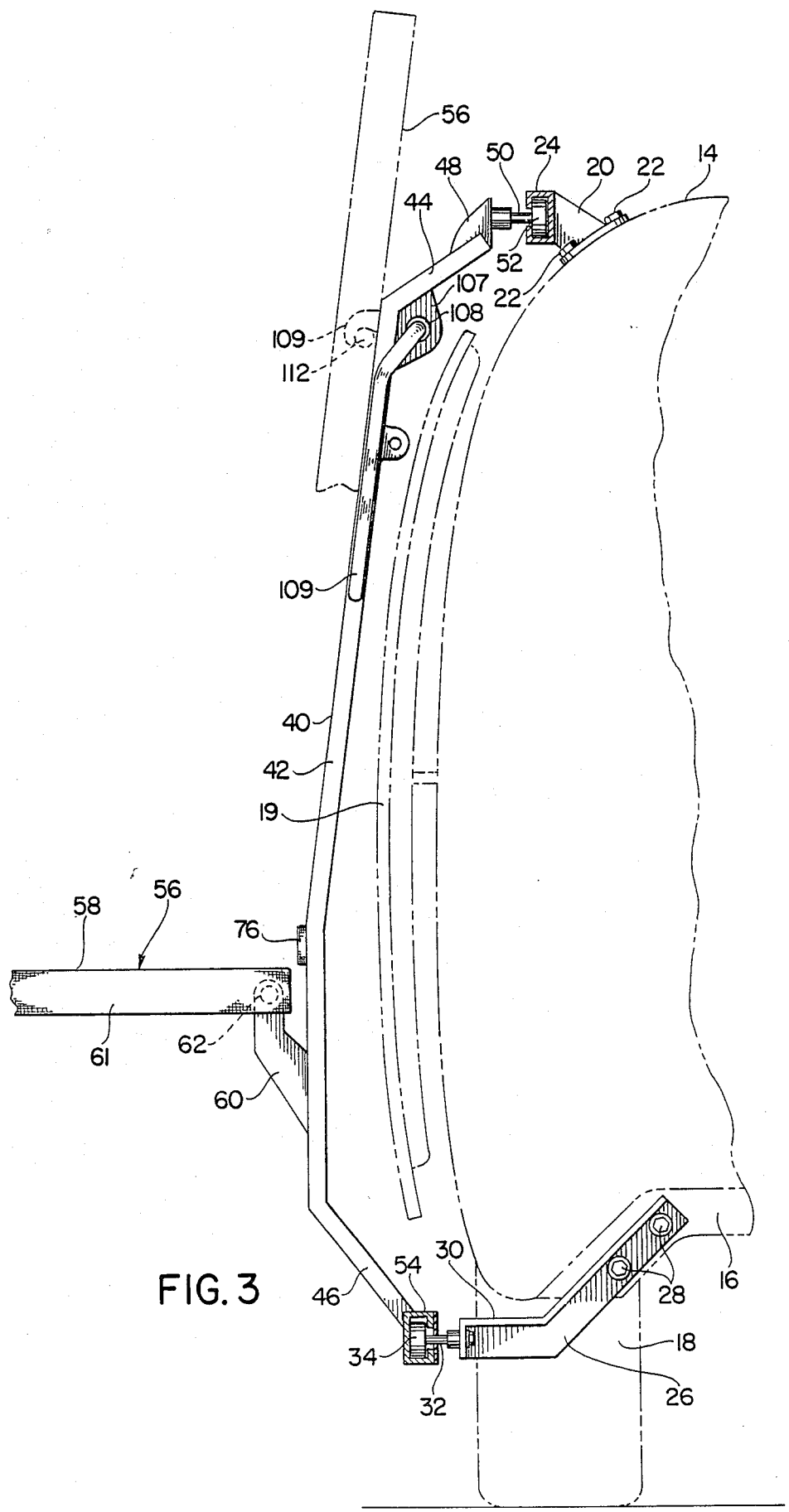

WORK TABLE ASSEMBLY MOUNTABLE ON A PANEL TRANSPORTING VEHICLE

BACKGROUND OF THE INVENTION

The present invention relates to a work table assembly that is mountable on a vehicle and is movable to a work position at an installation site for performing work operations on a panel as placed thereon.

It is the usual practice in transporting panels, such as glass panels, to an installation site to carry the glass panel on a rack that typically is mounted on the side of a truck, whether the type of truck is in the form of a closed van or an open pickup. These conventional-type racks are usually permanently affixed to the vehicle and are constructed and arranged for carrying a glass panel to the installation site in a relatively safe and secure manner. Examples of the prior known glass carrying racks are illustrated in U.S. Pat. Nos. 2,815,861; 3,412,867; 3,424,487; 4,078,708; 4,278,175 and 4,304,336.

At the installation site, it has been found in practice that additional glass cutting work operations are may be required for being performed on the glass panel, since the glass panel may not in all instances properly fit into the frame or holding means at the site of installation and must be trimmed or cut in a suitable manner for permitting the precise mounting of the glass panel in place. In order to perform these additional glass cutting work operations on the glass panel, it has been the usual practice in the trade to carry so-called "wooden horses" in the vehicle on which the glass panel is transported. The glass panel is placed on a platform that is supported by the wooden horses, and the work glass cutting operation is then performed thereon. Although this prior known work operation has been acceptable for the purpose intended, the use of the work horses and platform as mounted thereon is not always satisfactory for supporting the glass panel in the proper position, since a level surface is usually required; and further, the work horses and platform take up additional space in the vehicle interior that is sometimes needed for other equipment or tools as used in connection with the job being performed. Further, travel to a site for installation of a glass panel would require that the wooden horses and support be placed in the transporting vehicle, and sometimes this equipment is not always available and/or the workers performing the site installation must always remember to include such equipment in the glass transporting vehicle before travelling to the installation site.

Prior to the instant invention insofar as applicant is aware, there have not been any glass panel supporting tables included as a permanent part of the transporting vehicle; and, as will hereinafter be described, it is the purpose of the subject invention to mount a panel supporting table on the transporting vehicle as a permanent fixture thereon. However, other prior art of which applicant is aware that illustrates a table that is attached to a vehicle is in U.S. Pat. No. 4,501,457. This patent discloses a kitchen table for a camper and is not pertinent to the subject invention other than to disclose a table that is pivotally mounted on the side of the camper.

SUMMARY OF THE INVENTION

The present invention relates to a work table assembly that is fixed to a vehicle and that is utilized for supporting a panel thereon at the installation site of the panel when work operations are to be performed on the panel.

The work table assembly of the subject invention includes a frame construction that is provided with upper and lower support means and vertical brace members that are interconnected to the support means. The upper support means is supportable by the body of the vehicle on which the table assembly is mounted, and the lower support means is supported by the vehicle frame. The table assembly further includes a table member that is mounted on the vertical brace members and is pivotally movable relative thereto from an upper vertically disposed transport position to a lower horizontal work position at which work position the panel is received in supporting relation for a work operation thereon.

Other features of the invention provide for legs as joined to the table in pivotal relation that are pivotally movable from a nested upper position when the table member is located in the upper transport position to a lower support position when the table member is moved to the lower horizontal position. Another feature of the invention provides for movement of the work table assembly in a horizontal sliding movement for exposing a door opening in the vehicle body so as to provide access to the interior of the vehicle. In the transport position of the work table assembly, the frame construction thereof overlies the door and opening. When the work table member is to be moved to the lower position for receiving a panel thereon, the assembly is slidably moved beyond the door and door opening so as to provide for access to the vehicle interior. The sliding movement of the frame assembly is accomplished by providing rollers that are mounted in upper and lower tracks, the frame assembly being easily movable as the rollers are guided in the tracks to and from the open and closed positions of the assembly.

Accordingly, it is an object of the present invention to provide a unique work table assembly that is mountable on a vehicle as a permanent part thereof and that is quickly and easily moved to a lower horizontal position for supporting a flat panel or the like thereon, the work table assembly including a frame construction that is supported on the vehicle, and that is slidably movable to and from an overlying position relative to a vehicle door and opening.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a side elevational view of the work table assembly as embodied in the present invention and as mounted on the side of a vehicle, which is illustrated in phantom;

FIG. 2 is a view similar to FIG. 1 but showing the work table assembly following movement thereof to a rearmost position to expose the side door and opening of the vehicle and further illustrating a table member in the horizontal panel supporting position thereof; and FIG. 3 is an end elevational view of the work table assembly as shown in FIG. 2.

DESCRIPTION OF THE INVENTION

Referring now to the drawings and particularly to FIG. 1, the work table assembly as embodied in the subject invention is illustrated and is generally indicated at 10. Although the invention as described herein is directed to a work table assembly for supporting a glass panel thereon, it is understood that the work table assembly as described is also adaptable for supporting panels other than glass, such as panels made of wood, metal or plastic. It is further contemplated that various other kinds of work pieces having different shapes and configurations can be received on the table assembly; and therefore the reference to "panel" is construed to mean that any form of work piece may be located on the table assembly for a work operation thereon.

As will be described, the work table assembly 10 is mounted on a vehicle generally indicated at 12, the body and frame of which are illustrated in phantom. Although the motor vehicle 12 may vary in the construction thereof, it is contemplated that the vehicle which will be outfitted for carrying a glass panel is in the form of a conventional van that includes a van body 14 mounted on a bottom frame 16, wheels 17 being rotatably interconnected to the frame 16 in the conventional manner for supporting the frame and body thereon. The van body 14 is also preferably formed with a side door opening 18 and a door 19 that is slidably movable to and from the open and closed position relative to the opening 18 as will be referred to hereinafter.

As will be apparent hereinafter, the van 12 is provided with a conventional glass panel transporting or carrying rack (not shown) that is fixed to the side of the van opposite to the side on which the work table assembly 10 is mounted. In this connection, the work table assembly 10 is mounted on the van 12 adjacent to the curb so that the table assembly can be moved to a work operating position in a safe and unobstructing location.

Referring now to FIG. 3, an upper holding bracket 20 is shown mounted on the body 14 of the van adjacent to the roof thereof by conventional bolts 22 or the like. As illustrated in FIG. 2, a pair of the brackets 20 are fixed to the upper portion of the van body in spaced apart relation, and fixed to the brackets 20 is an elongated upper track or rail member 24 that extends horizontally for a substantial portion of the van body. Referring again to FIG. 3, an angle bracket 26 is shown mounted on the bottom frame 16 of the vehicle by means of bolts 28, a horizontal portion 30 of the angle bracket 26 extending outwardly beyond the lowermost portion of the body 14 and receiving therein in fixed relation a shaft 32 on which an outwardly extending stationary roller 34 is mounted. It is understood that two stationary rollers 34 are included in the assembly as illustrated in FIGS. 1 and 2.

Referring now to FIGS. 1 and 2, the work table assembly 10 as mounted on the vehicle is shown including a frame construction as defined by a horizontal upper brace 35 and by vertically extending braces 36, 38 and 40. The braces 36, 38 and 40 are substantially identical and have a configuration, which as illustrated in FIG. 3 and with reference to brace 4, is defined by an elongated body portion 42 to which is joined an upwardly and inwardly inclined upper portion 44 and a downwardly inclined lower portion 46. Fixed to the vertical braces 36, 38 and 40 are spaced upper brackets 48, each of which has a shaft 50 joined thereto on which a movable roller 52 is mounted, the movable roller 52 being received within the track or rail member 24 for rolling movement relative thereto. Fixed to the inclined lower portion of the braces 36, 38 and 40 at the lowermost end thereof is a horizontally extending track or rail member 54 that receives the stationary rollers 34 therein. An additional angularly extending brace 55 is joined to the corner of the frame construction as defined by the horizontal brace 35 and the vertical brace 36 and to the center brace 38 the angle brace 55 further adding to the rigidity of the frame construction. As further illustrated in FIG. 3, the angular configuration of the braces 36, 38 and 40 at the upper and lower ends thereof space the braces outwardly of the van body 14 to define a space between the braces and the van body, the purpose of which will hereinafter be described. It is seen that the work table assembly as defined by the frame construction is horizontally movable relative to the van body and vehicle frame, the lower rail member 54 moving on the stationary rollers 34 and the upper rollers 52 moving within the upper rail member 24.

In order to provide a suitable work surface for a glass panel at the installation site thereof, a table member generally indicated at 56 is provided and includes a platform 58 that is covered by a suitable soft fabric material, the platform 58 extending the entire length of the frame construction and being fixed in pivotal relation to holding brackets 60 that are mounted on the end braces 36 and 40. The platform 58 is formed with a downwardly extending skirt 61 that is also covered with the fabric material, the skirt 61 providing for the pivotal connection of the platform 58 to the brackets 60 at 62. As further shown in FIG. 1, the underside of the table member 56 includes lateral end rails 63 and 64 and interior lateral rails 66, 68 and 70 to which are joined a longitudinal extending rear rail 72 and a longitudinally extending front rail 74. Overlying rails 63-70 is the platform 58 that is fastened thereto in any suitable manner. In order to provide a rear buffer for the glass panel that is received on the platform 58 of the table member 56, a bumper 76 is provided and is fixed to the braces 36, 38 and 40 in any suitable manner. The bumper 76 is also covered with a soft fabric material against which the rear edge of the glass panel is placed during a work operation thereon. As again illustrated in FIG. 1, the table member 56 includes spaced legs 78 and 80 that are joined to spaced ears 81 and 82, respectively, that are in turn fixed to the skirt 61 of the platform 58, the legs 78 and 80 being pivotal between their respective ears 81 and 82 for movement to a vertical position, as shown in FIG. 2, when the table member 56 is moved to the support or work position thereof. As shown in FIGS. 1 and 2 the legs 78 and 80 are provided with telescoping portions 83 and 84, respectively, that enable the legs to be vertically adjustable to a desired height depending upon the surface on which the legs are placed in the position of use. Suitable pads 86 and 88 that are fixed to the lowermost ends of the telescoping portions 82 and 84, respectively, enable the legs 78 and 80 to be located in stable relation when mounted in the vertical position for supporting the table member 56.

In order to control the movement of the table member 56 as it is shifted from the vertical upright position to the horizontal work position, spring members 90 and 92 are provided and are located on support rods 94 and 96, respectively, that are carried in spaced brackets 98, 99 and 100, 101, the brackets 98-102 being fixed to the adjacent skirt 61 of the table member 56. During pivotal movement of the table member 56, the springs 90 and 92 are suitably tensioned through end projections 103 and 104, respectively, that engage the braces 36 and 40 to insure that the springs 90 and 92 resist the rapid downward movement of the table member 56 and lower the table in a controlled motion to the lower position. The springs 90 and 92 further enable the table member 56 to be easily lifted to the upper position thereof.

It is also desirable to lock the table in the uppermost vertical or nonuse position thereof, and for this purpose a lock assembly is provided, which as illustrated in FIG. 2 includes a lock bar 106 that is interconnected to the vertical braces 36 and 40 through brackets 107 in which an opening 108 is formed (see FIG. 3). Lock elements 109 having a hook configuration are joined to the lock bar 106 as shown in FIG. 3, and a lock handle 110 extends outwardly of the brace 40 and is joined to the lock bar 106. Reduced bars 111 and 112 are joined to the skirt 61 of the work table end members 63 and 64 and receive the lock elements 109 therearound when the handle 110 is lifted upwardly for locking the work table 56 in the upper vertical transport position thereof. A spring 114 is provided for encircling the lock bar 106 and tensioning the lock bar 106 as it is moved to the locking position thereof.

The van body 14 as previously described includes a side door opening 18 as shown in FIG. 2, the horizontally slidable door 19 normally enclosing the opening 18 as is well known in van constructions of this type. In order for the door 19 to move from the closed to the open position, it is moved on a track that forces the door outwardly of the adjacent surface of the van body so that the door can be slidably moved to the open position in overlying relation with respect to the van body, as illustrated in FIG. 2. The door 19 in the open position is also spaced from the van body as shown in FIG. 3. As previously described, the frame construction of the work table assembly as embodied in the subject invention is spaced from the van body, the space as created thereby providing for receiving the door 19 in the open position as also shown in FIG. 3.

In use of the work table assembly as embodied in the present invention, it will be assumed that the door 19 is disposed in the closed position thereof, thereby enclosing the door opening 18. In this position, the work table assembly is located in the position as illustrated in FIG. 1, wherein the work table assembly overlies the door 19 as it is disposed in the closed position thereof. With the table assembly disposed in the position of FIG. 1 and with the lock elements 109 located in the locking position, the van with a glass panel as mounted in the panel carrying rack (not shown) can transport the glass panel to an installation site. When the van reaches the installation site, and with the understanding that some on-site adjustments must be made to the glass panel, the work table assembly is movable to the position of use. In order to accomplish this, the table is slidably moved from the position in which it overlies the door 19 to the rearmost position thereof relative to the van body as shown in FIG. 2. The door 19 may then be moved to its open position as shown in FIGS. 2 and 3, thereby uncovering the door opening 18 and providing for access to the interior of the van. The table member 56 may now be moved to the work position thereof, and this is accomplished by lifting the lock handle 109 upwardly to cause the lock elements 109 to be released from the reduced lock bars 111 and 112. The table member is then urged downwardly against the action of the springs 90 and 92 to the lowermost position, the legs 78 and 80 being urged outwardly to a vertical position after having been properly adjusted. The table 56 is now disposed in a horizontal position. The glass panel that has been carried by the van in the glass carrying rack is then placed on the upper surface of the platform 58 which is covered with a suitable fabric to prevent scratching thereof, the rear edge of the glass abutting against the bumper 76. Work operations on the glass panel can be carried out on the table member 56 after which the glass panel can be moved to the place of installation for the installing thereof in the usual manner. After completion of the installation of the glass panel, the table member 56 is moved to the upper position and locked, and once the door 19 is slidably moved to its closed position, the frame assembly of the work table assembly is moved back to the position as shown in FIG. 1.

It is also contemplated that some form of a lock element be provided for locking the entire work table assembly in the nonuse position shown in FIG. 1. In this connection, it is contemplated that a lock bolt be inserted through the track 54 so as to prevent the forwardmost roller 34 from travelling therein, thereby locking the assembly in place. It is also contemplated that a stop position be provided for movement of the work table assembly to its rearmost position as shown in FIG. 2, and again a stop lock can be located in the track 54 at a suitable position for engagement by the forwardmost roller 34 for preventing further movement of the work table assembly.

It is seen that the work table assembly as illustrated and described herein provides a unique table that is available for use on the site of installation of a glass panel and that may be easily moved to and from the work position as requried.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A vehicle including a frame on which a body is mounted having an interior area formed thereon, a work table assembly being mountable on said frame for supporting a panel thereon during work operations on the panel at an installation site, said table assembly including a frame construction that includes upper and lower support means and vertical brace members, said vertical brace members connected to said upper and lower support means said upper support means being supportable by said vehicle body and said lower support means being supportable by said vehicle frame, and a table member that is mounted on said vertical brace members in pivotal relation and being pivotally movable relative thereto from an upper vertically disposed transport position to a lower horizontal work position at which work position a panel is received in supporting relation for a work operation thereon, a door mounted on said body and that is slidable from a closed to an open position to expose an opening in said body that provides access to the interior area of said vehicle, said table member overlying said door and opening in the transport position thereof and being horizontally slidable to expose said door and opening prior to said table member being pivotally movable to the lower panel supporting position thereof.

2. A vehicle as claimed in claim 1, legs joined to said table member in pivotal relation and being pivotally movable from a nested upper position when said table member is located in the upper transport position to a lower support position when said table member is moved to the lower horizontal work position.

3. A vehicle as claimed in claim 1, means fixed to said vertical braces for locking said table member in the upper vertical transport position.

4. A work table assembly as claimed in claim 1, said upper support means including an upper horizontally extending rail member that is mounted on said vehicle body and further including upper support members that cooperate with said upper rail member for mounting said frame construction on said vehicle body.

5. A work table assembly as claimed in claim 4, said lower support means including a lower horizontally extending rail member and lower brackets to which said lower rail member is interconnected, said lower brackets being fixed to said vehicle frame wherein said lower rail member is supported by said vehicle frame.

6. A work table assembly as claimed in claim 5, said rail members defining tracks, said upper rail member being fixed on said vehicle body and said lower rail member being joined to said frame construction, said upper support member having rollers mounted thereon that are receivable in the track of said upper rail member for rolling movement therein, said lower brackets having rollers joined thereto that are mounted for rolling movement in said lower rail member, wherein said frame construction is slidable on said rail members relative to said vehicle frame and body.

7. A work table as claimed in claim 6, said frame construction being spaced from said vehicle body by said upper and lower support means to define a space in which said door is movable as it is slidably moved in a horizontal direction to and from the closed and open positions thereof.

8. A work table as claimed in claim 6, spring members having end projections, one of which is connected to said frame construction and the other of which is connected to said table member wherein said spring members provide for a controlled movement of said table member as it is moved to and from the lower horizontal work position thereof.

* * * * *